United States Patent
Onoda et al.

(10) Patent No.: US 7,909,698 B2
(45) Date of Patent: Mar. 22, 2011

(54) INPUT DEVICE, INPUT DETERMINATION METHOD, GAME SYSTEM, GAME SYSTEM CONTROL METHOD, PROGRAM, AND INFORMATION STORAGE MEDIUM

(75) Inventors: Hiroyuki Onoda, Yokohama (JP); Hiroumi Endo, Adachiku (JP); Hiroshi Igarashi, Yokohama (JP); Junji Takamoto, Kyoto (JP); Takeshi Nagareda, Kyoto (JP); Kuniaki Ito, Kyoto (JP); Takao Shimizu, Ichikawa (JP)

(73) Assignees: Namco Bandai Games, Inc., Tokyo (JP); Nintendo Co., Ltd., Kyoto-shi (JP)

( * ) Notice: Subject to any disclaimer, the term of this patent is extended or adjusted under 35 U.S.C. 154(b) by 1839 days.

(21) Appl. No.: 10/936,592

(22) Filed: Sep. 9, 2004

(65) Prior Publication Data

US 2005/0130740 A1    Jun. 16, 2005

(30) Foreign Application Priority Data

Sep. 12, 2003  (JP) ................................. 2003-321946
Dec. 10, 2003  (JP) ................................. 2003-412468

(51) Int. Cl.
*A66F 13/00* (2006.01)
(52) U.S. Cl. ................................. 463/36; 463/7; 463/37
(58) Field of Classification Search ................ 463/7, 36, 463/37
See application file for complete search history.

(56) References Cited

U.S. PATENT DOCUMENTS

| 6,529,875 | B1 | 3/2003 | Nakajima et al. | |
| 6,545,699 | B2 | 4/2003 | Satoda | |
| 6,645,067 | B1 * | 11/2003 | Okita et al. | 463/7 |
| 6,960,137 | B2 | 11/2005 | Nishizawa et al. | |
| 2005/0101364 | A1 * | 5/2005 | Onoda et al. | 463/7 |

FOREIGN PATENT DOCUMENTS

| JP | Y-01-024659 | 7/1989 |
| JP | B-3088739 | 9/1991 |
| JP | A-06-086378 | 3/1994 |

(Continued)

OTHER PUBLICATIONS

U.S. Appl. No. 10/935,181, filed Sep. 8, 2004, Hiroyuki Onoda et al.

(Continued)

*Primary Examiner* — James S. McClellan
*Assistant Examiner* — Jeffrey Wong
(74) *Attorney, Agent, or Firm* — Oliff & Berridge, PLC

(57) ABSTRACT

With a game system, a timing fetch section fetches an input-timing for input data determined to be valid by an input-determination section, and an evaluation section compares the fetched input-timing and a reference-timing, and evaluates an operation with an operation section by a player or a sound-input action performed in answer to a first or second direction-mark. An input-reception section receives first and second input data generated based on an operation-detection of the operation section a sound-detection of the sound-detection section, respectively, and an input-determination section compares the first and second input data, determines that the first input data is valid when it is determined that the operation with the operation section by the player and the sound-input action by the player overlap within a given period, based on the first and second input data, and determines that the first and second input data are valid in other cases.

18 Claims, 10 Drawing Sheets

FOREIGN PATENT DOCUMENTS

| | | |
|---|---|---|
| JP | A-08-180022 | 7/1996 |
| JP | A-09-206291 | 8/1997 |
| JP | B-3230569 | 11/1997 |
| JP | A-2000-125172 | 4/2000 |
| JP | A-2001-070636 | 3/2001 |
| JP | A 2001-70652 | 3/2001 |
| JP | A-2001-079265 | 3/2001 |
| JP | A-2001-083968 | 3/2001 |
| JP | A-2001-096061 | 4/2001 |
| JP | A-2001-232057 | 8/2001 |
| JP | A-2001-314649 | 11/2001 |
| JP | A-2001-339703 | 12/2001 |
| JP | A-2002-066129 | 3/2002 |
| JP | A-2002-251194 | 9/2002 |
| JP | A-2002-282538 | 10/2002 |
| JP | A-2003-053028 | 2/2003 |
| JP | A-2003-122505 | 4/2003 |
| WO | WO 98/02223 | 1/1998 |

OTHER PUBLICATIONS

U.S. Appl. No. 10/936,589, filed Sep. 9, 2004, Hiroyuki Onoda et al.

U.S. Appl. No. 10/936,579, filed Sep. 9, 2004, Hiroyuki Onoda et al.

* cited by examiner

INPUT DEVICE, INPUT DETERMINATION METHOD, GAME SYSTEM, GAME SYSTEM CONTROL METHOD, PROGRAM, AND INFORMATION STORAGE MEDIUM

Japanese Patent Application No. 2003-321946, filed on Sep. 12, 2003, and Japanese Patent Application No. 2003-412468, filed on Dec. 10, 2003 are hereby incorporated by reference in their entireties.

BACKGROUND OF THE INVENTION

The present invention relates to an input device, a game system, a program, and an information storage medium.

Various proposals have been made in the art for inducing a player of a music game to use a controller (as an example of an operation section) and a microphone (as an example of a sound detection section) to perform a plurality of different types of input operation, such as striking operation (as an example of operation) and speech operations (as an example of sound input actions).

However, an input device such as a microphone that can also pick up ambient sounds will also detect sounds that the player does not intend to make, making it difficult to check input operations accurately if the playing environment of the game is noisy. In particular, if the controller is such as to generate a comparatively large operation sound such as that for a striking operation, the striking operation sound of the controller would be detected by the microphone, leading to a situation in which an input operation is identified incorrectly.

BRIEF SUMMARY OF THE INVENTION

A first aspect of the present invention relates to a program which causes a computer to function as:

a music play section which plays music data stored in a storage section;

a display control section which causes a display of a first direction mark and a second direction mark by linking to a play status of the music data, the first direction mark instructing a player to perform an operation of an operation section and the second direction mark instructing the player to perform a sound input action which is to be detected by a sound detection section;

an input reception section which receives first input data and second input data, the first input data being generated based on an operation detection of the operation section and the second input data being generated based on a sound detection of the sound detection section;

an input determination section which compares the first input data and the second input data, determines that the first input data is valid in a case that it is determined that an operation with the operation section by the player and the sound input action by the player overlap within a given period, based on the first and second input data, and determines that both of the first and second input data are valid in other cases;

a timing fetch section which fetches an input timing for input data that has been determined to be valid by the input determination section; and an evaluation section which compares the fetched input timing and a reference timing, and evaluates the operation with the operation section by the player or the sound input action by the player that has been performed in answer to the first or second direction mark.

A second aspect of the present invention relates to a program which causes a computer to function as:

a music play section which plays music data stored in a storage section;

a display control section which causes a display of a direction mark by linking to a play status of the music data, the direction mark instructing a player to perform an operation of an operation section;

an input reception section which receives first input data and second input data, the first input data being generated based on an operation detection of the operation section and the second input data being generated based on a sound detection of a sound detection section;

an input determination section which compares the first input data and the second input data, and determines that the first input data is valid only when it is determined that the operation detection of the operation section and the sound detection of the sound detection section overlap within a given period, based on the first and second input data;

a timing fetch section which fetches an input timing for the first input data that has been determined to be valid by the input determination section; and an evaluation section which compares the fetched input timing and a reference timing, and evaluates the operation with the operation section by the player that has been performed in answer to the direction mark.

A third aspect of the present invention relates to a computer-readable information storage medium which stores any of the above programs.

A fourth aspect of the present invention relates to a game system including:

a music play section which plays music data stored in a storage section;

a display control section which causes a display of a first direction mark and a second direction mark by linking to a play status of the music data, the first direction mark instructing a player to perform an operation of an operation section and the second direction mark instructing the player to perform a sound input action which is to be detected by a sound detection section;

an input reception section which receives first input data and second input data, the first input data being generated based on an operation detection of the operation section and the second input data being generated based on a sound detection of the sound detection section;

an input determination section which compares the first input data and the second input data, determines that the first input data is valid in a case that it is determined that an operation with the operation section by the player and the sound input action by the player overlap within a given period, and determines that both of the generated first and second input data are valid in other cases;

a timing fetch section which fetches an input timing for input data that has been determined to be valid by the input determination section; and an evaluation section which compares the fetched input timing and a reference timing, and evaluates the operation with the operation section by the player or the sound input action by the player that has been performed in answer to the first or second direction mark.

A fifth aspect of the present invention relates to an input device including:

an operation section which detects an operation performed by a player with respect to a predetermined operation area;

a sound detection section which detects a sound generated by a sound input action performed by the player;

an input data generation section which generates first input data based on the operation detection of the operation section and second input data based on the sound detection of the sound detection section; and an input determination section which compares the first input data and the second input data, determines that the first input data is valid when it is determined that the first and second input data are generated overlapping within a given period, and determines that both the first and second input data are valid in other cases;

A sixth aspect of the present invention relates to a method of controlling a game system for a music game in which a player plays by operating an operation section and performs a sound input action on a sound detection section, the method including:

playing music data stored in a storage section;

causing a display of a first direction mark and a second direction mark by linking to a play status of the music data, the first direction mark instructing a player to perform an operation of an operation section and the second direction mark instructing the player to perform a sound input action which is to be detected by a sound detection section;

receiving first input data and second input data, the first input data being generated based on an operation detection of the operation section and the second input data being generated based on a sound detection of the sound detection section;

comparing the first input data and the second input data, determining that the first input data is valid in a case that it is determined that an operation with the operation section by the player and the sound input action by the player overlap within a given period, and determining that both of the first and second input data are valid in other cases;

fetching an input timing for input data that has been determined to be valid by the input determination section; and comparing the fetched input timing and a reference timing, and evaluating the operation with the operation section by the player or the sound input action by the player that has been performed in answer to the first or second direction mark.

A seventh aspect of the present invention relates to an input detection method including:

generating first input data based on an operation detection of an operation section which detects an operation performed by a player with respect to a predetermined operation area;

generating second input data based on a sound detection of a sound detection section which detects a sound generated by a sound input action performed by the player; and comparing the first input data and the second input data, determining that the first input data is valid when it is determined that the first and second input data are generated overlapping within a given period, and determining that both the first and second input data are valid in other cases.

DETAILED DESCRIPTION OF THE EMBODIMENT

Figure 1:
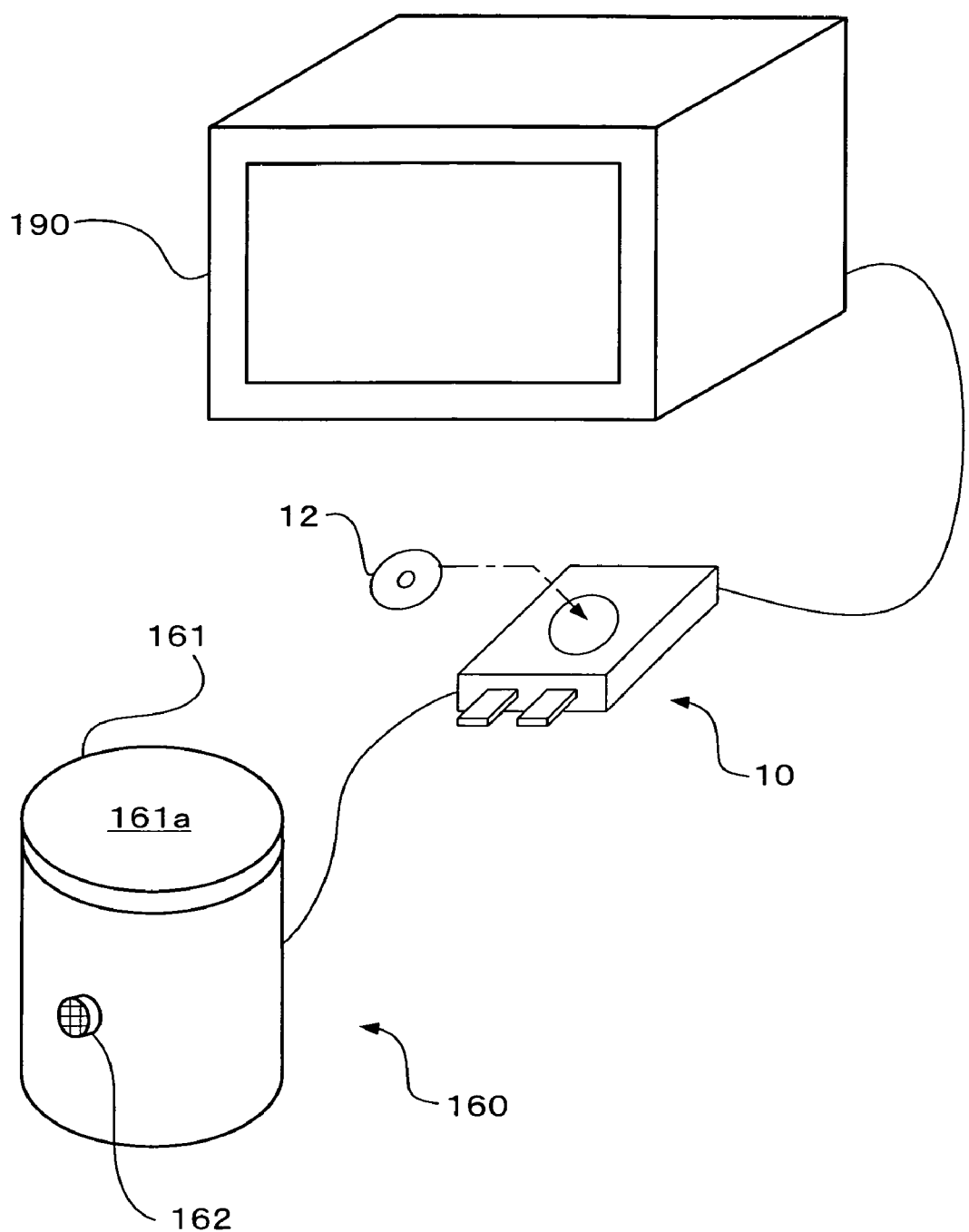
FIG. 1 shows an example of a game system in accordance with an embodiment of the present invention.

An embodiment of the present invention was devised in the light of the above situation, and may provide an input device, input determination method, game system, game system control method, program, and information storage medium which enable accurate checking of a plurality of different types of input operation.

An embodiment of the present invention provides a game system including:

a music play section which plays music data stored in a storage section;

a display control section which causes a display of a first direction mark and a second direction mark by linking to a play status of the music data, the first direction mark instructing a player to perform an operation of an operation section and the second direction mark instructing the player to perform a sound input action which is to be detected by a sound detection section;

an input reception section which receives first input data and second input data, the first input data being generated based on an operation detection of the operation section and the second input data being generated based on a sound detection of the sound detection section;

an input determination section which compares the first input data and the second input data, determines that the first input data is valid in a case that it is determined that an operation with the operation section by the player and the sound input action by the player overlap within a given period, based on the first and second input data, and determines that both of the first and second input data are valid in other cases;

a timing fetch section which fetches an input timing for input data that has been determined to be valid by the input determination section; and an evaluation section which compares the fetched input timing and a reference timing, and evaluates the operation with the operation section by the player or the sound input action by the player that has been performed in answer to the first or second direction mark.

An embodiment of the present invention provides a program which causes a computer to function as the above sections.

An embodiment of the present invention provides a computer-readable information storage medium which stores (records) a program which causes a computer to function as the above sections.

With these embodiments of the present invention, the first direction mark and the second direction mark are displayed linked to the play status of the music data, and the player performs operation of the operation section or sound input action corresponding to the type of direction mark that is displayed. The first direction mark indicates the player to perform operations with the operation section and the second direction mark indicates the player to perform a sound input action to be detected by the sound detection section. A sound input action could be the generation of a sound caused by an action of the player, such as a sound producing action, a time-beating action, or a strike sound generation action caused by striking an object (such as an action that generates a sound from a percussion instrument), or a vibration sound generation action caused by the vibration of an object (such as an action that generates a sound from a stringed instrument).

If an operation with the operation section is performed from the player, the first input data is generated based on the detection of the operation by the operation section, the second input data is generated based on the sound detection of the sound detection section, and the input determination section determines whether or not each set of input data is valid.

More specifically, if the system determines that the player's operation with the operation section and the sound input action are performed overlapping within the given period (in the case that the first input data and the second input data have been received overlapping in the input reception section for the same direction mark, by way of example), the first input data is determined to be valid. In such a case, it is deemed highly probable that the player has performed the operation with the operation section but that operation sound has been detected erroneously by the sound detection section, making it possible to prevent erroneous input data from the sound detection section and also accurately confirm that the operation with the operation section has been performed, by determining that the first input data is regular input data.

Since the probability of erroneous input data is deemed to be low in all other cases (in the case that it is determined that the player's operation with the operation section and the sound input action were performed in different time periods), for example, when the first input data and the second input data are received into the input reception section at input reception periods for different direction marks, the input determination section determines that each of the first and second input data is valid. It is therefore possible to confirm an operation with the operation section and a sound input action accurately, even with a configuration in which there are different types of input action (or input operation) with the operation section and the sound detection section.

In this case, "input data is valid" means that the input data is data to be used in game calculations (such as input timing fetch processing or operation/sound input action evaluation processing), in other words it refers to input data that is based on an operation or sound input action that the player intended. In other words, "input data is invalid" means that the input data is based on an input that the player did not intend, which is erroneous input data and which should not be used in the game calculations.

The input timing of input data that has been determined valid by the input determination section is then fetched by the timing fetch section. In a game that is implemented by any of these embodiments, an evaluation section compares the fetched input timing and a reference timing, to evaluate an operation with the operation section or a sound input action by the player. In other words, since the input timing that is used in the evaluation of an operation with the operation section or a sound input action by the player is fetched for input data that has been determined by the input determination section to be valid, it is possible to prevent the occurrence of mistaken evaluation (or mistaken game calculations) due to erroneous input data.

With these game system, program and information storage medium, the input determination section may determine that the second input data is valid only when the sound input action by the player is determined to be performed within a predetermined input reception period relating to the second direction mark.

This makes it possible to prevent the occurrence of a detection of erroneous input data in a more efficient manner, since the validity of input data for use in game calculations is determined only for the second input data, based on a sound detection performed within a predetermined input reception period for the second direction mark, without the determination of the validity of the second input data based on a sound detection, even when an erroneous sound detection is caused by an operation sound of the operation section in the period in which the operation with the operation section has been specified by the first direction mark.

In addition, if the configuration is such that the second input data is received by the input reception section only within a predetermined input reception period in such a situation, the determination processing for input data can be limited in the input determination section to the predetermined input reception period for the second direction mark. Since this makes it possible to monitor for erroneous input data by the input determination section only within that predetermined period, it enables a reduction in the processing load.

With these game system, program and information storage medium, the predetermined input reception period relating to the second direction mark may be divided into a plurality of periods, and the input determination section determines whether or not the second input data may be valid only within each of the plurality of input reception periods.

This enables accurate detection of continuous input operations within a predetermined period, even when an input device that performs detection regularly is used, such as a sound detection section. Since the input determination is performed only within the plurality of divided input reception periods in such a situation, it enables a reduction in the processing load.

With these game system, program and information storage medium, the display control section may perform a display control of changing a relative positional relationship between a reference mark and the first and second direction marks in such a manner that the relative positional relationship becomes closer, the reference mark indicating the reference timing, and a period during which the reference mark and the second direction mark overlap may be set to be the predetermined input reception period relating to the second direction mark.

With these game system, program and information storage medium, the display control section may perform a control of displaying to visualize the sound detection on the display section when the sound detection section detects a sound.

If the sound volume detected by the sound detection section reaches a predetermined sound volume level, for example, the control can be such that this fact is displayed on the display section. Since this enables confirmation of the sound detection performed by the sound detection section, it makes it possible to quickly discover if the sound detection section has broken down.

With these game system, program and information storage medium, the input determination section may determine that the second input data is valid when a sound volume of a sound detected by the sound detection section is larger than a reference sound volume level, the second input data being generated based on the sound detection corresponding to the detected sound, and the program further may cause the computer to function as a reference sound volume level adjustment section which adjusts the reference sound volume level in accordance with a sound volume level of noise detected by the sound detection section.

If the game is played in an environment in which the surroundings are noisy, for example, there is a danger that setting the reference sound volume level too low (the sensitivity too high) with cause noise to be detected as a sound input action. In such a case, it is possible to accurately confirm a sound generated by the sound input action of the player that occurs close to the sound detection section, by setting the reference sound volume level high (reducing the sensitivity). A configuration that enables adjustment of the reference sound volume in this manner makes it possible to prepare a playing environment in which the input operations of the player can be detected accurately.

With these game system, program and information storage medium, the input determination section may read out sample sound data which has been stored beforehand in the storage section, may determine whether the second input data matches with the sample sound data by comparison, and may determine the second input data to be valid when the second input data matches with the sample sound data.

This makes it possible to improve the playability of the game by enabling a more accurate determination of input state from a wide range of diverse sound input actions. The sample data in such a case is a sound generated by a sound input action to be detected by the sound detection section, converted into data (encoded, or made into a signal), and stored in storage section as waveform data, by way of example.

With these game system, program and information storage medium, the program may further cause the computer to function as a sample sound generation section which generates the sample sound data based on detection data for a sound input action performed by the player with respect to the sound detection section and may cause the storage section to store the generated sample sound data.

Since this makes it possible to set sample sound data for each player independently, it enables the implementation of a fascinating game that attracts the players' interest.

With these game system, program and information storage medium, the program may evaluate operations and sound input actions of a plurality of players with respect to a plurality of the operation sections and a plurality of the sound detection sections provided for the players, respectively, and the input determination section may fetch sound volume data detected by the sound detection sections, may compare the magnitude of the sound volume detected by each of the sound detection sections based on the detected sound volume data, and may determine that the second input data generated based on the sound detection of one of the sound detection sections determined to be closest to a location in which a sound has been generated is valid.

This makes it possible to accurately identify the sound input actions of each player and thus prevent erroneous input data, even when a plurality of players is playing the game.

With these game system, program and information storage medium, the input determination section may determine that the first input data to be valid, only when the operation detection of the operation section and the sound detection of the sound detection section are determined to overlap within a given period.

If the player is required to perform an action that generates an operation sound, such as a striking operation, in answer to a first direction mark, the first input data is determined to be valid only when the striking operation has been performed as a correct input operation of the operation section. In other words, since the input operation with respect to the first direction mark can be monitored by a sound detection of the sound detection section, that is sufficient to ensure the player to perform the correct input operation.

An embodiment of the present invention provides a game system including:

a music play section which plays music data stored in a storage section;

a display control section which causes a display of a direction mark by linking to a play status of the music data, the direction mark instructing a player to perform an operation of an operation section;

an input reception section which receives first input data and second input data, the first input data being generated based on an operation detection of the operation section and the second input data being generated based on a sound detection of a sound detection section;

an input determination section which compares the first input data and the second input data, and determines that the first input data is valid only when it is determined that the operation detection of the operation section and the sound detection of the sound detection section overlap within a given period, based on the first and second input data;

a timing fetch section which fetches an input timing for the first input data that has been determined to be valid by the input determination section; and an evaluation section which compares the fetched input timing and a reference timing, and evaluates the operation with the operation section by the player that has been performed in answer to the direction mark.

An embodiment of the present invention provides a program which causes a computer to function as the above sections.

An embodiment of the present invention provides a computer-readable information storage medium which stores (records) a program which causes a computer to function as the above sections.

With these embodiments of the invention, if the player is required to perform an action that generates an operation sound, such as a striking operation, in answer to a direction mark, the first input data used for evaluating the player's operation is determined to be valid only when the striking operation has been performed as a correct input operation of the operation section. In other words, since the input operation with respect to the direction mark by the player can be monitored by a sound detection of the sound detection section, that is sufficient to ensure the player to perform the correct input operation.

An embodiment of the present invention provides an input device including:

an operation section which detects an operation performed by a player with respect to a predetermined operation area;

a sound detection section which detects a sound generated by a sound input action performed by the player;

an input data generation section which generates first input data based on the operation detection of the operation section and second input data based on the sound detection of the sound detection section; and an input determination section which compares the first input data and the second input data, determines that the first input data is valid when the first and second input data are generated overlapping within a given period, and determines that both the first and second input data are valid in other cases.

With this embodiment of the invention, if the player performs an operation with respect to a predetermined operation area of the operation section, the input data generation section generates the first input data based on the detection of the operation with the operation section. Similarly, if the player performs a sound input action, the input data generation section generates the second input data based on the sound detection of the sound detection section. The input determination section determines whether or not that input data is valid (whether or not it is to be used in predetermined information processing such as game calculations).

More specifically, if the system determines that the player's operation with the operation section and the sound input action are performed overlapping within the given period (in the case that the first input data and the second input data have been received overlapping in the input reception section for the same direction mark, by way of example), the first input data is determined to be valid. In such a case, it is deemed highly probable that the player has performed the operation with the operation section but that operation sound has been detected erroneously by the sound detection section, making it possible to prevent erroneous input data from the sound detection section and also accurately confirm that the operation with the operation section has been performed, by determining that the first input data is regular input data.

Since the probability of erroneous input data is deemed to be low in all other cases (in the case that it is determined that the player's operation with the operation section and the sound input action were performed in different time periods), for example, when the first input data and the second input data are received into the input reception section at input reception periods for different direction marks, the input determination section determines that each of the first and second input data is valid. It is therefore possible to confirm an operation with the operation section and a sound input action accurately, even with a configuration in which there are different types of input action (or input operation) with the operation section and the sound detection section.

This input device may further include a detection display section which outputs a display to visualize the sound detection when a sound is detected by the sound detection section.

If the sound volume detected by the sound detection section reaches a predetermined sound volume level, for example, the control can be such that this fact is displayed on the detection display section. Since this enables confirmation of the sound detection performed by the sound detection section, it makes it possible to quickly discover if the sound detection section has broken down.

This input device may further include a sound detection confirmation operation section which performs a given confirmation operation based on the sound detection when a sound is detected by the sound detection section.

For example, if the sound volume detected by the sound detection section reaches a predetermined sound volume level, a confirmation operation could be performed to output a sound effect, vibrate at least part of the input device, or induce a reaction in the player, which also enables confirmation that the sound detection section is functioning normally.

With this input device,
the input determination section may determine that the second input data is valid when a sound volume of a sound detected by the sound detection section is larger than a reference sound volume level, the second input data being generated based on the sound detection corresponding to the detected sound, and the input device may include a reference sound volume level adjustment section for adjusting the reference sound volume level in accordance with a sound volume level of noise detected by the sound detection section.

If the game is played in an environment in which the surroundings are noisy, for example, there is a danger that setting the reference sound volume level too low (the sensitivity too high) with cause noise to be detected as a sound input action. In such a case, it is possible to accurately confirm a sound generated by the sound input action of the player that occurs close to the sound detection section, by setting the reference sound volume level high (reducing the sensitivity). A configuration that enables adjustment of the reference sound volume in this manner makes it possible to prepare a playing environment in which the input operations of the player can be detected accurately.

The embodiments of the present invention are described below with reference to the drawings. The present invention is not limited to the embodiment described below and thus it can be embodied in various ways within the scope of the invention laid out herein.

1. Configuration

An example of a game system in accordance with this embodiment is shown in FIG. 1. This game system comprises an input device 160 that is in the shape of a drum or the like (a percussion-instrument-shaped controller, a main unit (game device) 10, and a display section 190. The input device 160 comprises an operation section 161 having a predetermined operation area 161a and a sound detection section 162 (such as a microphone) for detecting ambient sounds. The player performs an operation input by striking the operation area 161a with a hand, by way of example. A sensor (not shown in the figure) is provided within the input device 160 for detecting various actions corresponding to the operation area 161a of the operation section 161 and the sound detection section 162, and the striking operation and sound input actions of the player can be checked by using this sensor. The input device 160 also comprises an input data generation section 163 that generates operation input data (generally speaking: first input data) based on operation detected by the operation section 161 and sound input data (generally speaking: second input data) based on sounds detected by the sound detection section 162. The input data generation section 163 executes processing to fetch detection signals (generally speaking: detection data) from the operation section 161 and the sound detection section 162, and subject the detection signals to A/D conversion or waveform shaping to turn them into input data for game calculations (data specified in input signals).

The main unit 10 executes game processing to generate game images and game sounds, based on input data from the input device 160 (either data made specific by an input signal or data derived from an input signal) and a program stored in an information storage medium 12 (such as a CD or DVD). The thus-generated game images are displayed on the display section 190.

Note that although the input device 160 and the main unit 10 (game generation device) are provided separately in FIG. 1, the configuration could also be such that the main unit 10 (the game processing section and image generation section) is provided within the input device 160. In such a configuration, the input device 160 (game controller) would be connected directly to the display section 190 and game images would be displayed on the display section 190. In addition, although the example given in FIG. 1 relates to a domestic game device, the present invention can also be applied to an arcade game device.

Figure 2:
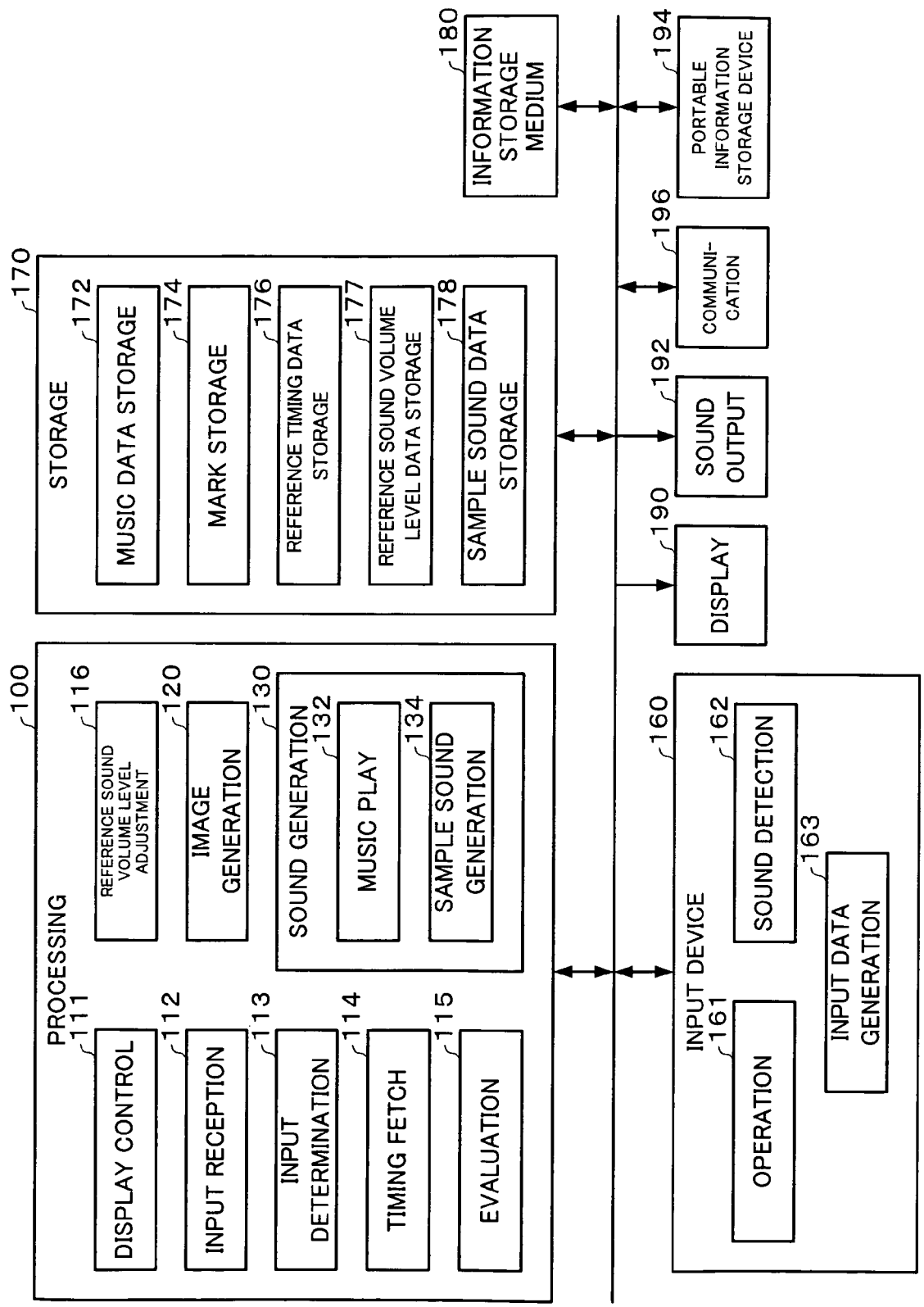
FIG. 2 shows a typical functional block diagram of the game system of this embodiment.

A functional block diagram of a game system (image generation system) in accordance with this embodiment is shown in FIG. 2. Note that the game system of this embodiment does not necessarily comprise all of the structural elements (components) shown in FIG. 2, and thus some of them could be omitted. In addition, the music game implemented by the game system (program) of this embodiment could be a game that enables the performance of music with an input device shaped like a musical instrument, or it could be a dance game in which the user dances to music.

The input device 160 is designed to enable the player to input operation input data and sound input data, and the functions thereof can be implemented by hardware such as a percussion-instrument-shaped controller (generally speaking: an operating member), operating buttons, operating levers, or an audio input microphone (generally speaking: a sound detection member). A storage section 170 forms a work area for components such as a processing section 100 and a communications section 196, and the functions thereof can be implemented by hardware such as RAM.

An information storage medium 180 (a medium that can be read by a computer) holds information such as a program and data, and the functions thereof can be implemented by an optical disk (CD or DVD), a magneto-optical disk (MO), a magnetic disk, a hard disk, magnetic tape, or memory (ROM). The processing section 100 bases the execution of the various different processes of this embodiment on the program (data) stored in this information storage medium 180. In other words, a program that causes a computer to function as the various components of this embodiment (a program for executing various processing in a computer) is stored in the information storage medium 180.

The display section 190 is designed to output the images generated by this embodiment, and the functions thereof can be implemented by hardware such as a CRT, LCD panel, touch-panel display, or head-mounted display (HMD). A sound output section 192 is designed to output the sounds generated by this embodiment, and the functions thereof can be implemented by hardware such as a speaker or headphones. A portable information storage device 194 stores data such as a player's personal data and saved game data, and various devices such as a memory card or a portable game machine could be used as this portable information storage device 194. The communications section 196 provides various types of control for communicating with an external device (such as a host device or another game system), and the functions thereof can be implemented by hardware such as various types of processor or a communications ASIC, or by a program.

Note that a program (data) for causing a computer to function as the various sections of this embodying example could be distributed to the information storage medium 180 (the storage section 170) from an information storage medium possessed by a host device (server), through a network and the communications section 196. Such use of an information storage medium on the host device (server) is also comprised within the scope of the present invention.

The processing section 100 (processor) executes various types of processing, such as game processing, image generation processing, or sound generation processing, based on information such as input data from the input device 160 or a program. The game processing performed by the processing section 100 in such a case includes processing such as that for starting the game if certain game start conditions have been satisfied, processing for moving the game forward, processing for disposing display objects such as direction marks and characters, processing for displaying the display objects, processing for calculating game results, or processing for ending the game if certain game start conditions have been satisfied. The processing section 100 executes the various processes while using the storage section 170 as a work area. The functions of this processing section 100 can be implemented by hardware such as various different processors (such as a CPU or DSP) or an ASIC (gate array), or by a program (game program).

The processing section 100 comprises a display control section 111, an input reception section 112, an input determination section 113, a timing fetch section 114, an evaluation section 115, a reference sound volume level adjustment section 116, an image generation section 120, and a sound generation section 130. Some of these components could be omitted.

The display control section 111 controls the display of a plurality of display objects, including direction marks (music notes marks) and reference marks. More specifically, it executes processing such as that to dispose display objects, move the display objects, or modify the images of the display objects. In this case, a direction mark is a mark for specifying an operation that the player should perform, using the operation section 160. Image data therefor is stored in a mark storage section 174 of the storage section 170. These direction marks include an operation input direction mark (generally speaking: a first direction mark) that specifies an operation with the operation section 161 and a sound input direction mark (generally speaking: a second direction mark) that specifies a sound input action with respect to the sound detection section 162. A reference mark (reference position) is mainly a mark (position) that indicates reference timing to the player, for evaluating the operation input timing and sound input timing of the player. This image data is also stored in the mark storage section 174 of the storage section 170.

If necessary, the display control section 111 also controls the display of an image for confirming the fact that a sound detection has been performed, if a sound is detected by the sound detection section 162, if necessary. Note that the display confirming the fact of sound detection could be done only when the detected sound volume exceeds a predetermined sound volume level. In other words, the display control could be such that the player can discern that the sound detection section 162 has performed a normal sound detection.

The input reception section 112 executes processing to fetch and receive the input generated by the input device 160, if the player who has been instructed by various direction marks has performed an input operation with respect to the input device 160 (if the player has played the percussion instrument or clapped hands. More specifically, it monitors and fetches input data from the input device 160 at each frame. It then executes processing to receive input data by accumulating and storing the thus-fetched input data in a given storage buffer. Note that a frame (such as 1/60 second or 1/30 second) is the unit of time used for game processing (such as object movement or action processing) and image generation processing.

The input determination section 113 determines whether or not the input data that has been fetched from the input device 160 and received by the input reception section 112 is valid (whether or not it can be used in the game processing). If the input determination has determined that the player's operation with the operation section 161 and a sound input action with respect to the sound detection section 162 have overlapped within a given period, it determines that the operation input data (first input data) generated based on the operation detection of the operation section 161 is valid and the sound input data (second input data) generated based on the sound detection of the sound detection section 162 is invalid.

More specifically, if the sound input data and the operation input data are received by the input reception section 112 overlapping within the given period, it is highly probable that the sound input data is erroneous input data and thus the operation input data has priority and is determined to be valid. In all other cases, such as when the sound input data and the operation input data are received in different periods, each set of input data is determined to be valid.

The configuration could also be such that the input determination section 113 determines that the operation input data to be valid only when the operation detection of the operation section 161 and the sound detection of the sound detection section 162 are determined to have overlapped within the given period. If the player is asked to perform an action that generates an operation sound, such as a striking operation, in answer to an operation input direction mark, this makes it possible to determine whether the operation input data is valid, but only when the striking operation has been performed as a correct input operation of the operation section 161. In other words, since input operations of the player with respect to the operation input direction marks can be monitored by sound detections of the sound detection section 162, that is sufficient to ensure that the player performs the correct input operation.

If necessary, the input determination section 113 can also be configured to determine the validity of sound input data that is generated based on a sound detection with respect to detected sound, when the volume of the sound detected by the sound detection section 162 has exceeded a reference sound volume level. More specifically, the input determination section 113 reads out reference sound volume level data that is stored in a reference sound volume level data storage section 177 of the storage section 170, and uses that data to determine whether or not the input sound volume corresponding to sound input data that has been received reaches the reference sound volume level (exceeds the reference sound volume level). It then determines that the sound input data is valid if the input sound volume is determined to reach the reference sound volume level, or invalid otherwise.

In addition, the configuration could be such that the input determination section 113 compares predetermined sample sound data and the sound input data to see whether or not they match and, if they do match, it determines the sound input data to be valid. More specifically, it reads out sample sound data that has been stored beforehand in a sample sound data storage section 178 of the storage section 170, compares the received sound input data with the sample sound data to see if they match, and determines whether or not the sound input data is valid. In other words, the input determination section 113 determines that the sound input signal is valid if it matches the sample sound data, or invalid if it does not match.

The timing fetch section 114 fetches the input timing for the input data that has been determined valid in the input determination section 113. More specifically, the fetching of the input timing is based on reception information (reception timing) for the input data that is buffered at each frame. Note that the input timing could also be derived from the input data itself, which has been determined to be valid in the input determination section 113.

The evaluation section 115 performs a comparison of the input timing fetched by the timing fetch section 114 and the reference timing, and bases an evaluation of the player's operation or sound input action on the result of the comparison. More specifically, reference timing data that acts as a model is stored in a reference timing data storage section 176 of the storage section 170. The evaluation section 115 reads out the thus-stored reference timing data, and performs processing to determine how well the fetched input timing and the reference timing match, or processing to determine how far the input timing and the reference timing are away from each other.

With this embodiment of the invention, the display control section 111 controls the display of each reference mark corresponding to reference timing, each operation input direction mark (first direction mark) that specifies an operation input to the operation section 161, and each sound input direction mark (second direction mark) that specifies a sound input action to the sound detection section, linked to the play of the music data. When the player has performed an operation input of the operation section 161 or a sound input action with respect to the sound detection section 162, the evaluation section 115 compares that input timing and the reference timing, evaluates the player's operation by the result of that determination, and calculates the player's score and the like. Note that the display of direction marks linked to the play of the music data is such that the display of movement of the various direction marks and the reference mark is started together with the start of play of the music data (music data output) and this movement display ends with the end of play of the music data. The display of direction marks linked to the play of the music data (play status) also includes the association of the timing at which the various direction marks are displayed with the sound play timing of the music data, by way of example.

The reference sound volume level adjustment section 116 executes processing to adjust the reference sound volume level in accordance with the sound volume level of ambient noise, and store the thus-set data in the reference sound volume level data storage section 177 of the storage section 170. Note that the configuration could also be such that the player can vary the amount of adjustment of the reference sound volume level by a setting of the input device 160.

The image generation section 120 executes drawing processing based on the results of various different processes executed by the processing section 100, to generate images for output to the display section 190.

The sound generation section 130 executes sound processing based on the results of various different processes executed by the processing section 100, to generate game sounds such as background music, sound effects, and voices for output to the sound output section 192. The play of music data of the music game implemented by the game system of this embodiment is done by a music play section 132. More specifically, processing is executed to read out music data (generally speaking: music sound data) that has been stored in a music data storage section 172 of the storage section 170, generate game sounds based on this music data, and output the same to the sound output section 192.

The sound generation section 130 comprises a sample sound generation section 134. The sample sound generation section 134 executes processing to generate sample sound data that is based on detection data (such as waveform data for a sound detection signal) for a sound input action that the player has performed with respect to the sound detection section 162, and store that data in the sample sound data storage section 178 of the storage section 170.

Note that the game system of this embodiment could be a system provided with a dedicated single-player mode, which enables one player to play the game, or it could also be a system provided with a multi-player mode, which enables a plurality of players to play. If a plurality of players are playing, the game images and game sounds supplied to this plurality of players could be created by using one terminal, or they could be created by using a plurality of terminals connected by a network (transmission lines or communications circuitry) or the like.

2. Method of this Embodiment

The description now turns to the method of this embodiment, with reference to the accompanying figures.

2.1 Operation Direction and Sound Input Direction Method

With this embodiment, the system displays operation input direction marks that specify operation of the operation section 161 of the input device (percussion-instrument-shaped controller) 160 and sound input direction marks that specify sound input actions such as hand-clapping at the sound detection section 162, and evaluates the operation or sound input actions of the player (generally speaking: a performance evaluation).

Figure 3A:
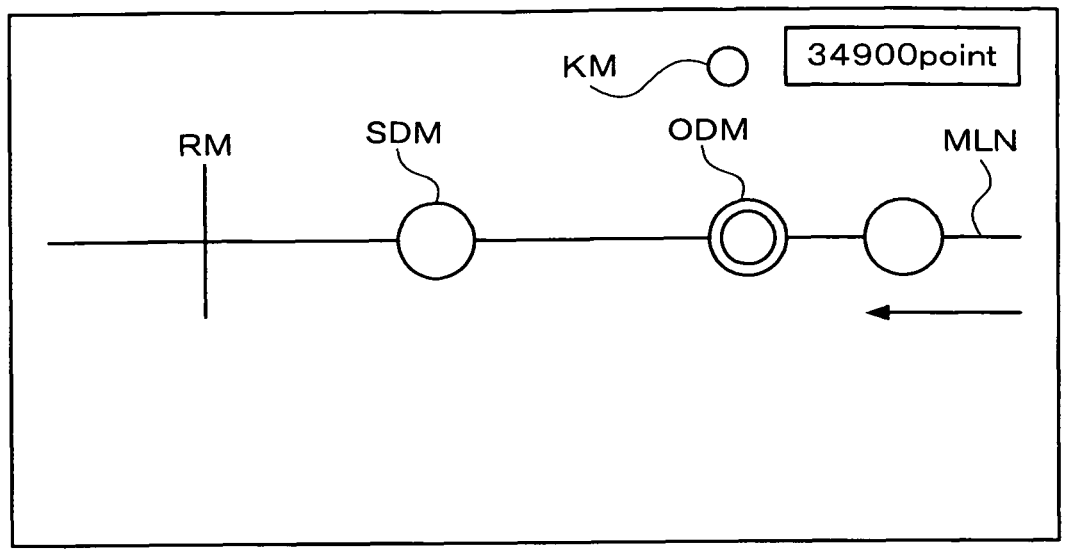
FIGS. 3A and 3B show examples of direction mark display control.
Figure 3B:
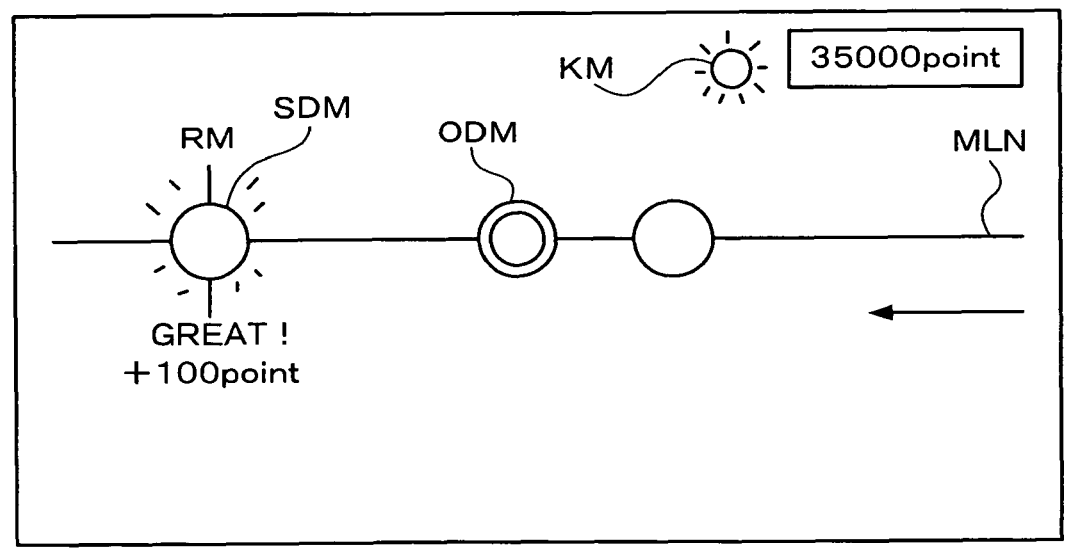

Examples of game images in a music game that is implemented by this embodiment are shown in FIGS. 3A and 3B.

In FIG. 3A, an operation input direction mark SDM and a sound input direction mark ODM of substantially circular shapes move along a line (score) MLN towards a line-shaped reference mark RM, with the display being linked to the play of music data. Each operation input direction mark SDM and sound input direction mark ODM is displayed in a manner that enables the player to identify the corresponding specification. For example, these marks could have different shapes, patterns, or colors. The player observes the movement of the operation input direction mark SDM and the sound input direction mark ODM through a game image that is displayed on the display section 190, and performs an operation (such as a striking operation) of the operation section 161 of the input device 160 to match the timing at which the operation input direction mark SDM passes the reference mark RM, by way of example, as shown in FIG. 3B. If the operation is performed at the timing (reference timing) at which the central portion of the operation input direction mark SDM overlays the reference mark RM, a high evaluation ("GREAT") is obtained and a high score ("100 points") is achieved in the music game. Similarly with the sound input direction mark ODM; if a sound such as hand-clapping (generally speaking: a sound input action) occurs at the timing at which the central portion of the sound input direction mark ODM overlaps the reference mark RM, a high score is obtained.

Note that the operation input direction mark SDM and the sound input direction mark ODM are shown to move and the reference mark RM is displayed halted in FIGS. 3A and 3B, but the configuration could also be such that the operation input direction mark SDM and the sound input direction mark ODM are halted and the reference mark RM is shown to move. Alternatively, the configuration could be such that the operation input direction mark SDM and the sound input direction mark ODM and also the reference mark RM move towards each other. In other words, the configuration could be such that the relative positional relationship between the reference mark RM for determining the timing and the operation input direction mark SDM and the sound input direction mark ODM is made to change, so that they are displayed approaching each other. If the game that is implemented by this embodiment is played by a plurality of players, the control could be such that the operation input direction mark SDM and the sound input direction mark ODM are displayed at the same display timing for all the players, or the control could be such that the display timing is different for each player.

As shown in FIGS. 3A and 3B, an action confirmation mark KM is displayed on the game image displayed by the display section 190. If the sound detection section 162 has detected a sound that exceeds a predetermined sound volume (threshold sound volume), this action confirmation mark can be made to flash to notify the player that the detection has occurred, as shown in FIG. 3B. If the player has performed the operation specified by the operation input direction mark SDM in the example shown in FIG. 3B, the operation sound of the operation section 161 is detected by the sound detection section 162 and the player is notified of that fact by a flashing display. Since this enables confirmation that the sound detection section 162 has performed a sound detection, even during the playing of the game, it makes it possible to quickly discover if the sound detection section has broken down. Note that if a sound that exceeds the predetermined sound volume has been detected, the control could be such that the action confirmation mark KM is displayed. The display of the action confirmation mark KM could be done by displaying a change of color, instead of flashing.

2.2 Input Determination Methods

The description now turns to the input determination methods of this embodiment. This embodiment determines whether or not the operation input data (first input data) generated based on the operation detection of the operation section 161 of the input device 160 and the sound input data (second input data) generated based on the sound detection of the sound detection section 162 are valid (whether or not they are data that can be used in game calculations). More specifically, if the input reception timings of operation input data and sound input data overlap within a given unit determination period, the system determines that only the operation input data is valid. If the input reception timings of both types of data are outside the same unit determination period (or within different unit determination periods), the system determines that each set of input data is valid. Thus this embodiment of the invention enable accurate confirmation of inputs, even when the player has performed different types of operation input to the operation section 161 and sound input to the sound detection section 162.

Figure 4A:
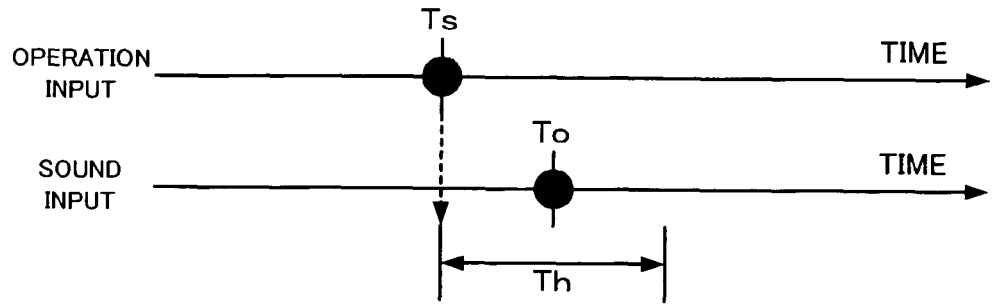
FIGS. 4A to 4D show examples of input data determination.
Figure 4B:
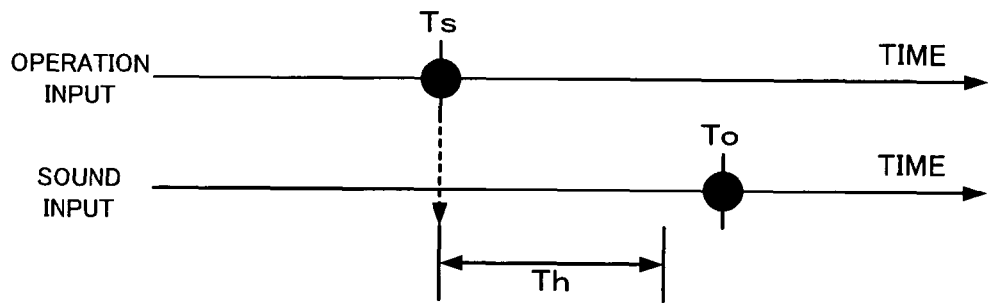

A first method of judging the operation input data and sound input data is shown in FIGS. 4A and 4B.

A given period (such as a few seconds or a few frames) from a timing Ts at which the operation input data has been received (or a timing To at which a sound input data has been received) is determined to be a unit determination period Th, by way of example. This makes it possible to prevent the use of erroneous input data in the evaluation of the player's operation or sound inputs, when the sound detection section 162 erroneously detects an operation sound of the operation section 161 and input data is generated based on that detection.

With the first determination example shown in FIG. 4A, if the player's operation with the operation section 161 and a sound input action to the sound detection section 162 are determined to overlap within the unit determination period Th, it is highly probable that the sound input data is due to the sound detection section 162 erroneously detecting an operation sound of the operation section 161, and thus the operation input data is determined to be input data that the player intended, and so it is determined to be valid. Note that the operation input data could also be determined to be valid only if the reception timing Ts of the operation input data and the reception timing To of the sound input data are within the unit determination period Th.

If the sound input data is received at the timing To after the unit determination period Th has elapsed from the reception of the operation input data at the timing Ts, as shown in FIG. 4B on the other hand, the system determines that each set of input data has been generated by the player performing an operation with the operation section 161 and a sound input action with the sound detection section 162, and thus both are determined to be valid.

Note that a modification of this first determination example could be such that the unit determination period is counted (or timed) from the reception of each of the operation input data and the sound input data, the unit determination period for the operation input data and the unit determination period for the sound input data are compared, only the operation input data is determined to be valid if there is an overlap between the two periods (the sound input data is determined to be invalid), or both sets of input data (both the operation input data and the sound input data) are determined to be valid otherwise.

Figure 4C:
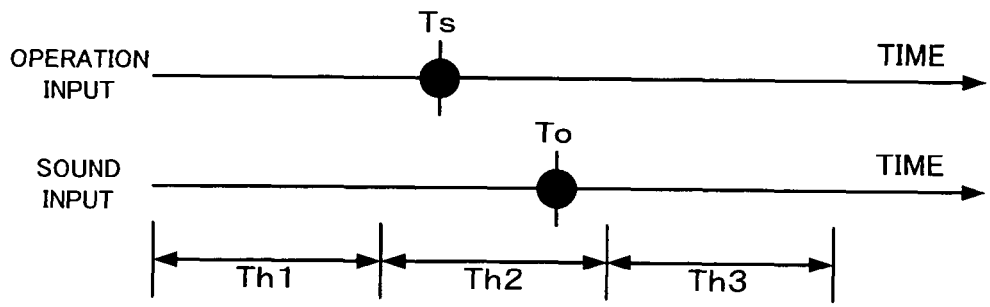
Figure 4D:
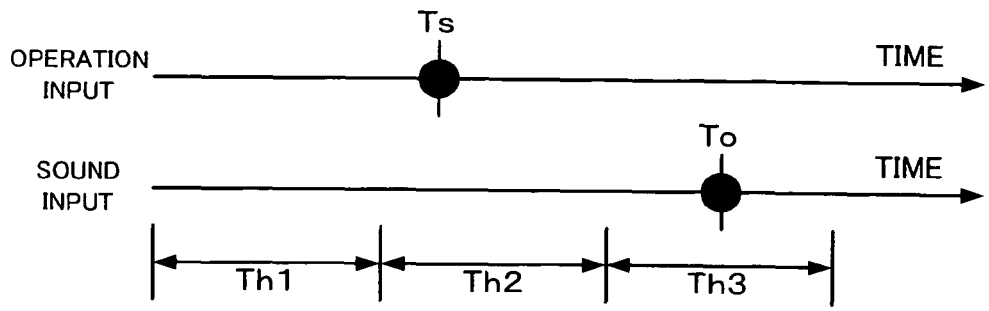

A second example of determination for the operation input data and the sound input data is shown in FIGS. 4C and 4D.

In the second determination example, unit determination periods Th1, Th2, . . . Thn are set beforehand and the operation input data is determined to be valid if there is an overlap between the reception timings of operation input data and sound input data within any of these unit determination periods. Both sets of input data are determined to be valid if the reception timings of the operation input data and the sound input data are within different unit determination periods.

More specifically, if the reception timing Ts of the operation input data and the reception timing To of the sound input data are within the same unit determination period Th2, as shown in FIG. 4C, it is highly probable that the sound input data is due to the sound detection section 162 erroneously detecting an operation sound of the operation section 161. Thus the operation input data is determined to be input data that the player intended (data to be used in the game calculation processing), and so it is determined to be valid. Note that the operation input data could also be determined to be valid only if the reception timing Ts of the operation input data and the reception timing To of the sound input data are within the same unit determination period.

If the reception timing Ts of the operation input data is within the unit determination period Th2 and the reception timing To of the sound input data is within the unit determination period Th3, as shown in FIG. 4D on the other hand, the system determines that each set of input data has been generated by the player performing an operation with the operation section 161 and a sound input action with the sound detection section 162, and thus both are determined to be valid.

Figure 5A:
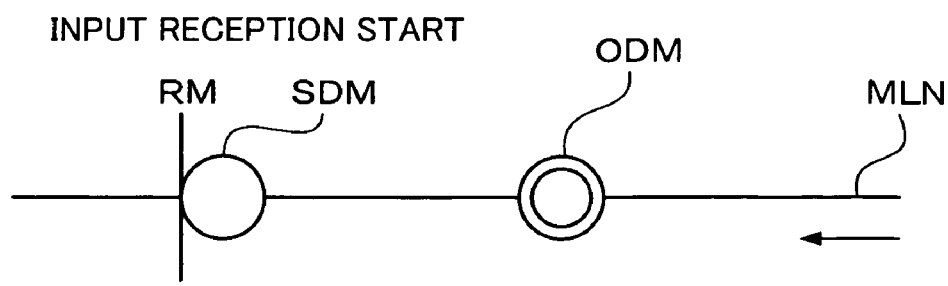
FIGS. 5A to 5C are illustrative of the direction mark input reception period.
Figure 5B:
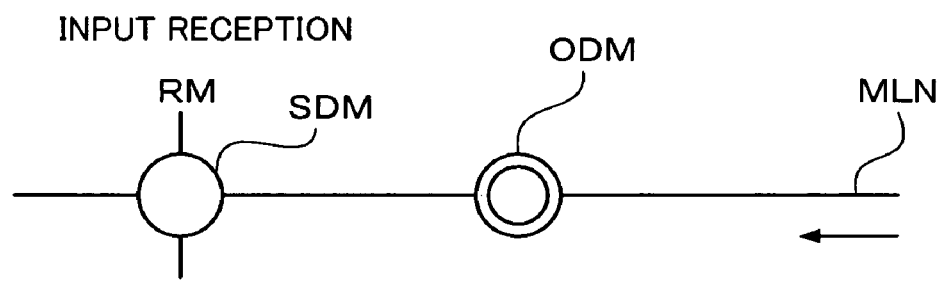
Figure 5C:
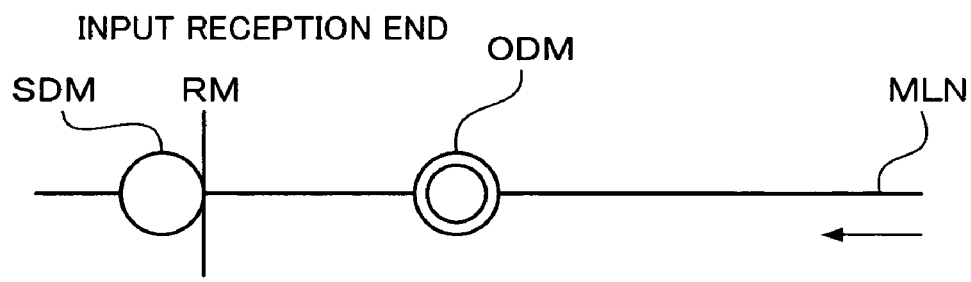

Note that each unit determination period can be set to impose a connection between an operation input direction mark and a sound input direction mark. For example, if operation input data and sound input data are received within an input reception period for an operation input direction mark, data that is based on the input that the player intended is determined to be operation input data, and thus it is possible to appropriately evaluate the operation of the player with respect to the operation input direction mark, by determining the operation input data to be valid and the sound input data to be invalid. More specifically, as shown in FIGS. 5A to 5C, if the display of the operation input direction mark SDM and the sound input direction mark ODM is controlled so that they approach the reference mark RM, the period during which the operation input direction mark SDM overlaps the reference mark RM (the period during which the operation input direction mark SDM and the reference mark RM match or the period during which the operation input direction mark SDM passes the reference mark RM) is assumed to be the input reception period for the operation input direction mark SDM, and that input reception period is set to be the unit determination period.

Reasoning similar to that for the operation input direction mark SDM can be used to regulate the input reception period for the sound input direction mark ODM, and that input reception period can be assumed to be the unit determination period.

In this case, it is possible to perform the input determination in such a manner that the sound input data is determined to be valid only when the sound input data has been received in the input reception period for the sound input direction mark ODM. This makes it possible to accurately evaluate the operation or sound input of the player, by assuming that an input error of the player or an operation sound of the operation section has been detected erroneously if sound input data is received in the input reception period for the operation input direction mark SDM, and thus excluding that data from the game processing data. In such a case, the processing for determining the validity of the sound input data can also reduce the processing load because it is limited to the input reception processing for the sound input direction mark. If a plurality of players are using individual copies of the input device 160 to play the game, particularly if the display timing for the sound input direction mark ODM is controlled to be different for each player, only sound input data that is received within the input reception period for each sound input direction mark ODM that instructs a player to perform a sound input action is treated as valid (or sound input data that is received outside that input reception period is treated as invalid), enabling accurate confirmation of the sound input actions of each player.

In addition, in a situation in which input determination is performed by using the input reception period for the sound input direction mark ODM, the input reception period can be divided into first to nth input reception periods, and the validity of sound input data is limited to that received in each of these first to nth input reception periods. This makes it possible to confirm a plurality of sound input actions that are performed with a short period, such as when input operations are performed a plurality of times in sequence (barrage input) for one sound input direction mark ODM, and also makes it possible to reduce the processing load in comparison with a method in which the validity is determined with respect to all of the sound input data that is received within the entire input reception period.

During the input determination of the sound input data, the determination of the validity can also be limited to sound input data that has been determined to exceed a reference sound volume level, if the system determines whether or not the sound volume detected by the sound detection section 162 corresponding to the received sound input data reaches the reference sound volume level (or exceeds the reference sound volume level) and it determines that the detected sound volume has reached the reference sound volume level. This enables the implementation of accurate game-play evaluation by determining that sound input data is not valid (determining that it is invalid) when ambient noise or the like is detected by the sound detection section 162.

If such a reference sound volume level is used in the input determination, it is preferable that the reference sound volume level can be adjusted to suit the ambient noise level, either automatically or as set by the player. When playing in an environment in which the surroundings are noisy, for example, there is a danger that setting the reference sound volume level too low (the sensitivity too high) will result in noise being detected as a sound input action. When a plurality of players are playing the game and a copy of the input device 160 is provided individually for each player, the sound generated by a sound input action of one player could be detected by the sound detection section 162 of the input device 160 of another player, generating erroneous input data. Particularly when sound input direction marks that instruct each of the plurality of players to perform sound input actions are displayed at different timings, the sound input actions are performed in different time periods, leading to a situation in which the above-described erroneous input data can easily be generated. In such a case, the sounds generated by sound input actions of the player close to the sound detection section 162 can be confirmed accurately by setting the reference sound volume level to be high (reducing the sensitivity). A configuration that enables adjustment of the reference sound volume in this manner makes it possible to prepare a playing environment in which the input actions of the players can be detected accurately. When a plurality of players play the game by using the input devices 160 that are provided individually to each of the players, the configuration could be also be such that data relating to the detected sound volume (detected sound volume data) of each sound detection section 162 is fetched, the closeness of the location at which the detected sound was generated to each of the input devices 160 is obtained by comparing the magnitude of the thus-detected sound volume, and the sound input data that is generated based on the sound detection of the sound detection section 162 that is determined to be closest to the location at which the detected sound was generated is determined to be valid. Alternatively, the configuration could be such that the sound input data that is generated based on the sound detection of the sound detection section 162 that is determined to be farthest from the location at which the detected sound was generated is determined to be invalid. This also enables accurate confirmation of the sound input actions of a plurality of players.

During the input determination of sound input data, the determination of validity can be done by collating (comparing) sample sound data that is stored beforehand in the sample sound data storage section 178 of the storage section 170 and the received sound input data, and limiting the determination of validity to sound input data that matches sample sound data. The sample data in such a case is a sound which has been detected by the sound detection section 162, converted into data (encoded, or made into a signal), and stored in the sample sound data storage section 178 as waveform data. The sample sound data could be a percussive sound such as that of hand-clapping or voice-print data such as audio. This makes it possible to improve the playability of the game by enabling a more accurate determination of sound input data from a wide range of diverse sound input actions.

Figure 6A:
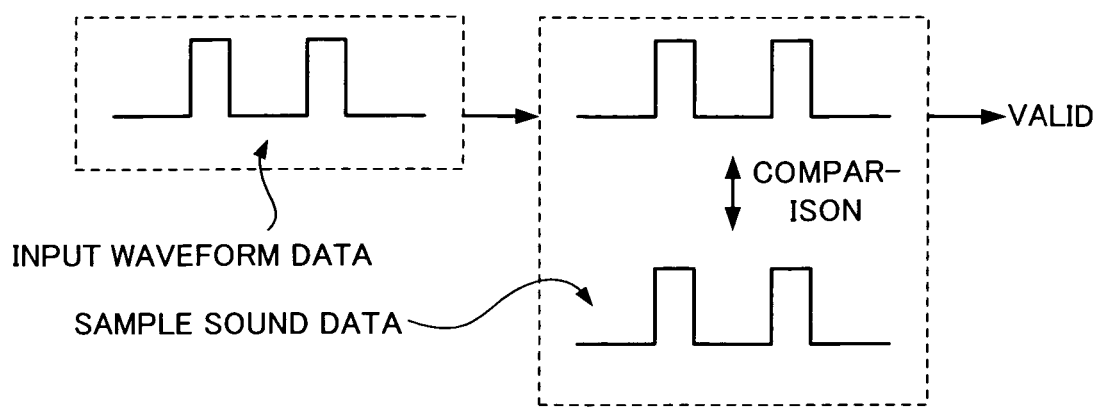
FIGS. 6A and 6B show examples of input data determination.

More specifically, input waveform data derived from sound input data is compared against sample sound data that is stored as waveform data, as shown in FIG. 6A. In such a case, since the input waveform data and the sample sound data are determined to match, the sound input data corresponding to the input waveform data is determined to be valid.

Figure 6B:
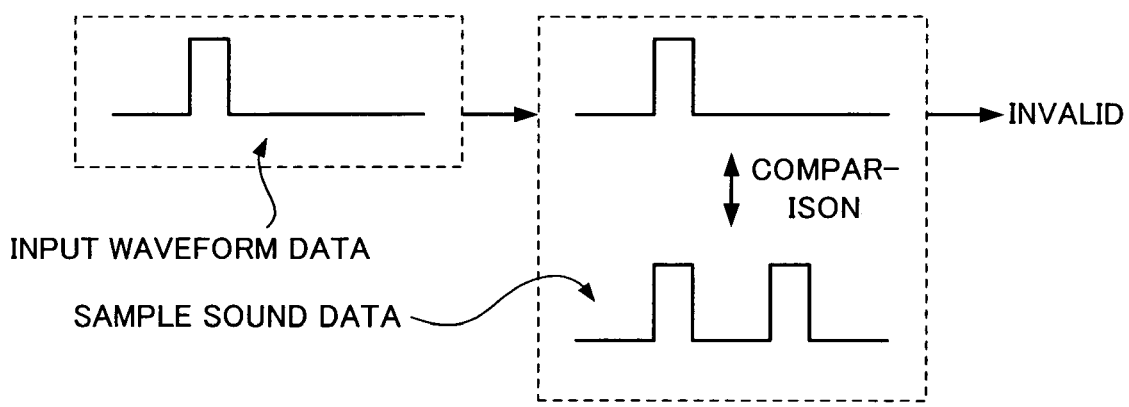

If the result of the comparison between the input waveform data derived from the sound input data and the sample sound data is such that there is no match, as shown in FIG. 6B on the other hand, the sound input data corresponding to the input waveform data is determined to be invalid (not valid).

When sample sound data is used in the input determination, the configuration could be such that each player is made to perform a sound input action before the game starts, and sample data based on the thus generated sound is generated in the sample sound generation section 134 and stored in the sample sound data storage section 178. In such a case, the previously stored sample sound data is read out for each player during the game, to determine the validity of the sound input data. Since this makes it possible to set sample sound data for each player independently, it enables the implementation of a fascinating game that attracts the players' interest.

3. Processing of this Embodiment

Figure 7:
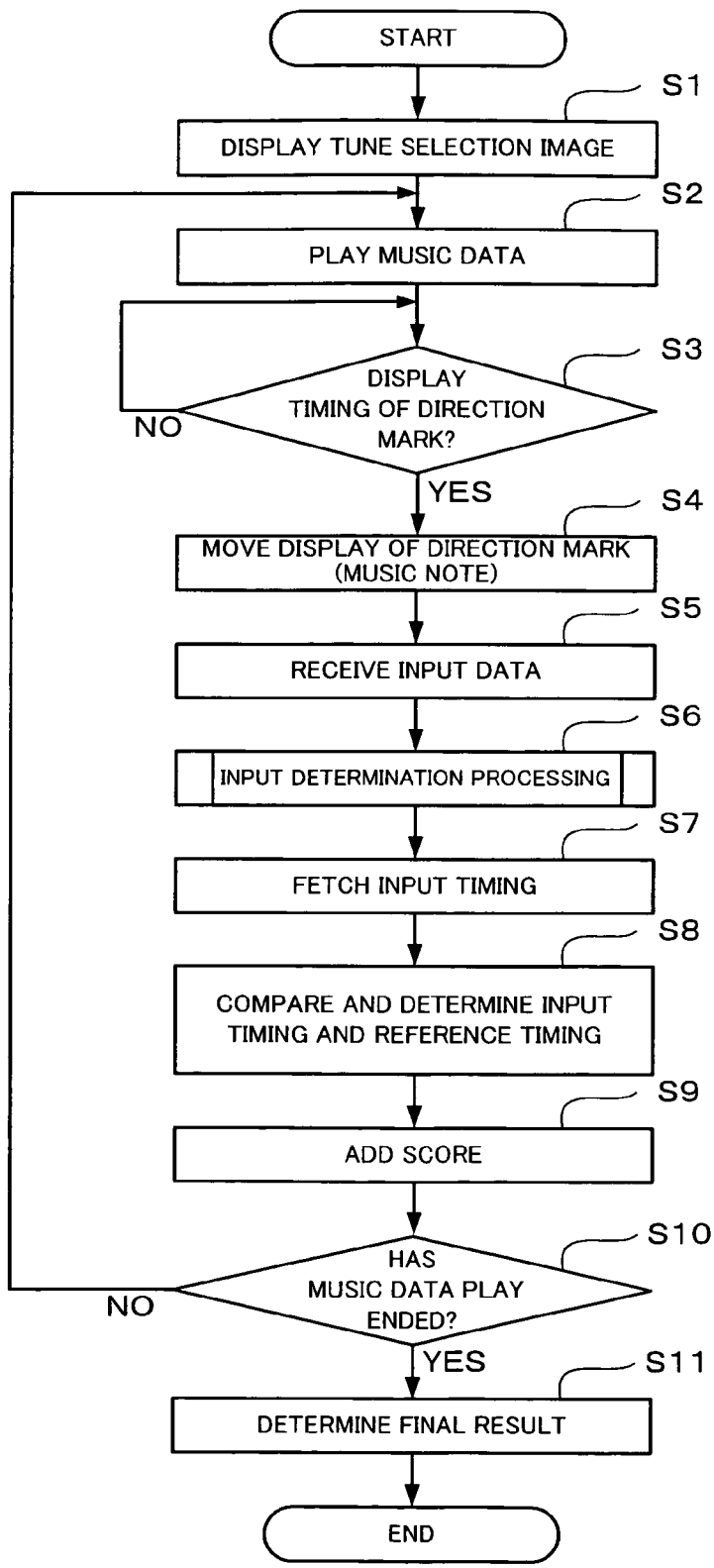
FIG. 7 is a flowchart of an example of the processing of this embodiment.

The description now turns to a detailed example of the processing of this embodiment, with reference to the flowchart of FIG. 7.

First of all, the system performs processing to display an image that enables the player to select a tune for the music game (step S1). It then outputs the music of the tune selected by the player (step S2). In other words, the music play section 132 reads out and plays the music data of the tune selected from the music data storage section 172, for output from the sound output section 192.

The system then determines the timing for the display of the various direction marks (music notes) whose display is set to be linked to the play status of the music data. More specifically, it determines whether this is display timing for an operation input direction mark or display timing for a sound input direction mark.

During this time, if the display timing of one of the various direction marks arrives during the play of the music data (YES at step S3), the movement display processing for the various direction marks (music notes) is done as described previously with respect to FIG. 3 (step S4). In other words, each operation input direction mark or sound input direction mark is moved along the line at a given movement speed. Note that the reference mark could be made to move towards the direction marks during the movement display processing of step S4.

The description now turns to the reception of input data concerning the various direction marks (step S5). In other words, if the player performs an operation with the operation section 161 or a sound input action with respect to the sound detection section 162, as specified by the direction mark that is displayed by the movement display processing of step S4, the system samples the data input by the player for every frame, for example, and holds it in a storage buffer for input data. The system then determines whether or not the received input data is valid (whether or not the input data is to be used in game calculations), which is called input determination processing (step S6). The input determination processing will be described in detail later.

The system then fetches the input timing of the input data determined to be valid (input data to be used in game calculations) by the input determination processing (step S7). In other words, it specifies the input timing, based on the reception information (reception timing) of the input data that is held in the storage buffer.

The system then executes processing to compare and determine the fetched input timing and the reference timing (step S8). In other words, it compares the input timing data that is held in a storage buffer and the reference timing data that is stored in the reference timing data storage section 176. The comparison determination processing is performed in such a manner that the evaluation of the operation or sound input action of the player is higher as the difference between the input timing and the reference timing is smaller (as the input timing and the reference timing match), by way of example.

The system then performs addition processing on the score of the player (step S9). More specifically, a score corresponding to an evaluation of the player's operation, determined by the comparison of step S8, is added to the player's score.

The system then determines whether or not the tune has ended (step S10), and if it has not ended the flow returns to step S2. If it has ended, the system determines the final game result of the player and displays it (step S11).

Figure 8:
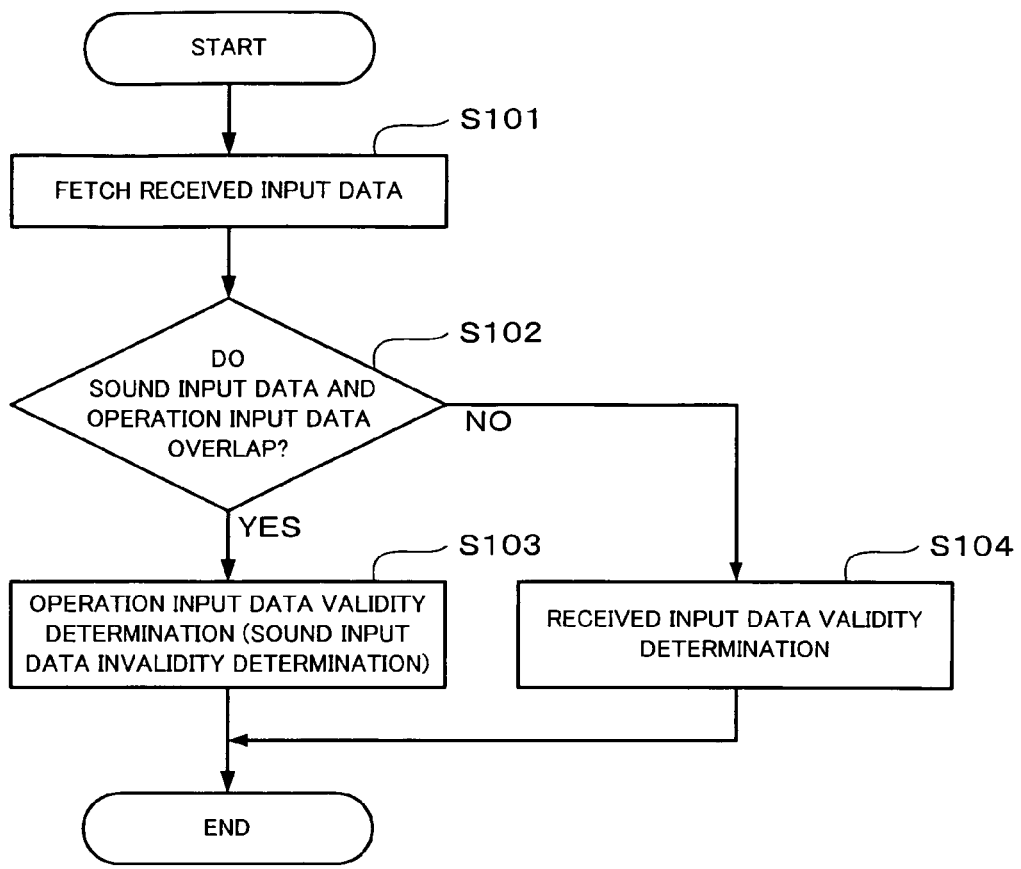
FIG. 8 is a flowchart of the example of the processing of this embodiment.

The description now turns to a more detailed account of the previously described input determination processing, using the flowchart of FIG. 8.

First of all, the system fetches reception input data (operation input data or sound input data) (step S101) and determines whether or not sound input data and operation input data overlapped within the unit determination period (step S102). More specifically, the system determines whether or not the reception timing of the operation input data received by the input reception section 112 and the reception timing of the sound input data are within the same determination period, based on the method shown in FIG. 4.

If the result of the determination is such that the sound input data and the operation input data were received within the same unit determination period (YES at step S102), the system determines that the operation input data is valid (or the sound input data is invalid) (step S103). In all other cases (NO at step S102), such as when the sound input data and operation input data are received in different unit determination periods, the system determines that each received input data (the sound input data and operation input data) is valid (step S104).

4. Variant Input Device Examples

The description now turns to modifications of the input device 160 that can be used in the game system of this embodiment.

First of all, the input device 160 can have the processing functions of the processing section 100 of the game system. For example, the input determination section 113, the reference sound volume level adjustment section 116, or the sample sound generation section 134 shown in FIG. 2 could be implemented on the input device side. If the functions of the input determination section 113 are implemented on the input device 160 side, by way of example, it is possible to determine the validity of input data that is generated by determining whether or not the timings at which the sound input data and operation input data are generated are within the same unit determination period.

Figure 9A:
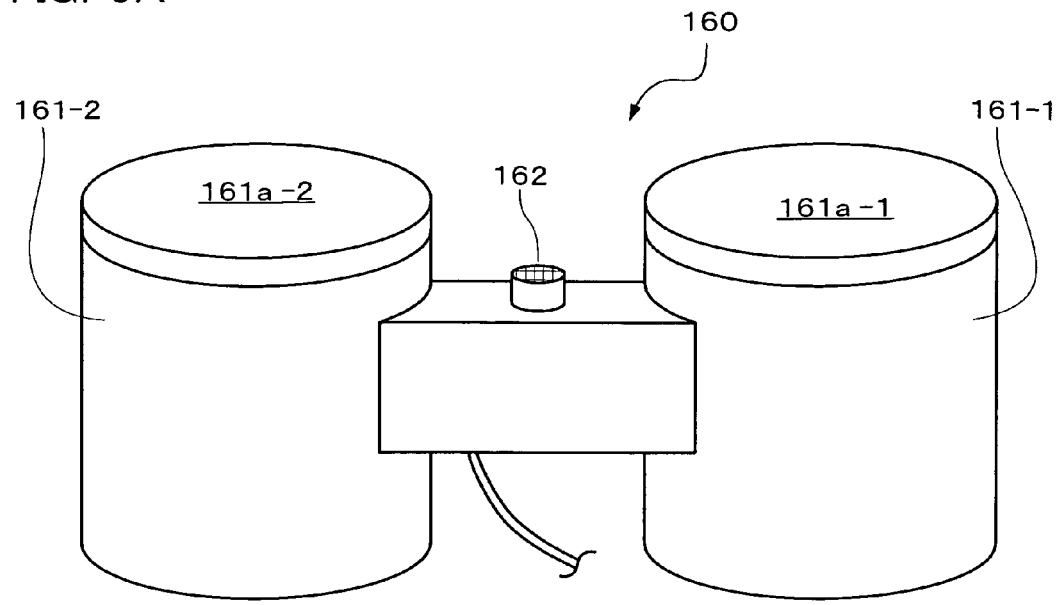
FIGS. 9A and 9B show modifications of the input device of an embodiment of the present invention.

The input device 160 is not limited to the configuration shown in FIG. 1; it could also be provided with operation areas 161a-1 and 161a-2 separately on a plurality of operation sections 161-1 and 161-2, as shown in FIG. 9A. This makes it possible to diversify the operation input, enabling a concomitant improvement in the playability of the music game.

Figure 9B:
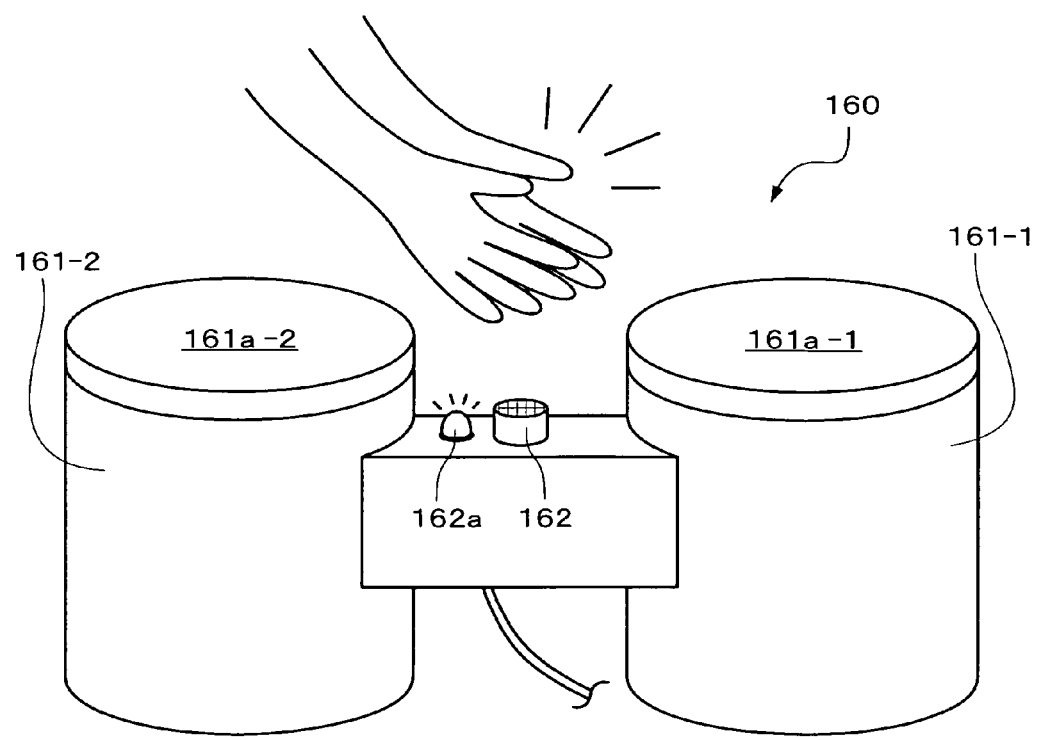

The input device 160 could also be provided with a detection display section 162a that reacts when the sound detection section 162 detects a sound input action such as hand-clapping, to display that detection in a visible manner, as shown in FIG. 9B. For example, if the sound volume detected by the sound detection section 162 exceeds a predetermined sound volume level, that could be displayed by the detection display section 162a. Since this enables confirmation of the sound detection performed by the sound detection section, it makes it possible to quickly discover if the sound detection section has broken down. Note that a light-emitting member such as an electric bulb or an LED, a liquid crystal display, or an EL display could be employed as the detection display section 162a.

In addition, a sound detection confirmation operation section (not shown in the figure) could be provided to perform a given confirmation operation based on a sound detection, if a sound is detected by the sound detection section 162 in the input device 160. The sound detection confirmation operation section could be implemented by a speaker, vibrating member, or reaction-imparting member, by way of example. More specifically, if the sound volume detected by the sound detection section 162 exceeds a predetermined sound volume level, a sound effect is output, or at least part of the input device 160 is made to vibrate, or a confirmation operation that imparts a reaction to the player is performed, enabling confirmation that the sound detection section 162 is functioning normally.

Figure 10A:
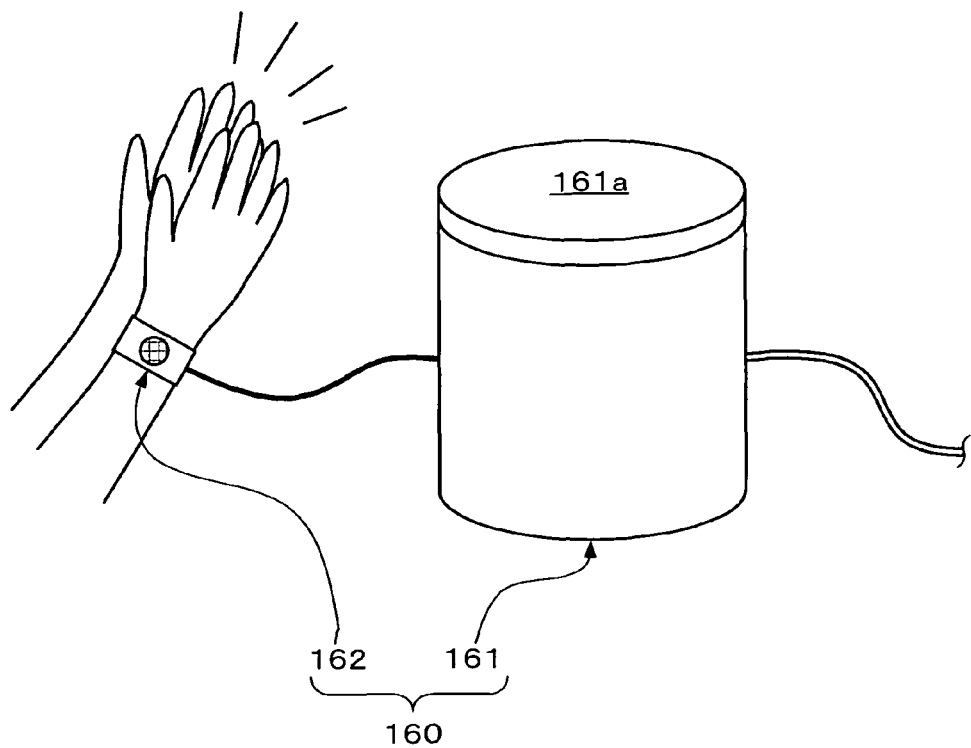
FIGS. 10A and 10B show modifications of the input device of this embodiment.
Figure 10B:
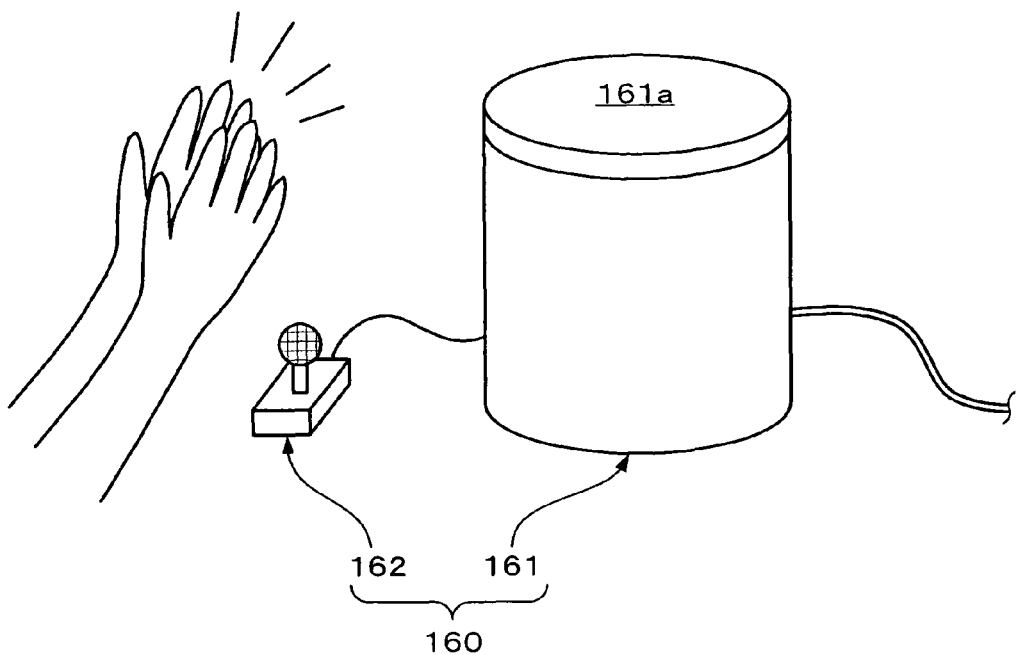

With the above-described configuration, the operation section 161 and the sound detection section 162 are formed in an integrated housing, but the configuration could also be such that the sound detection section 162 is formed as a wristband wound around the wrist of the player to detect the sound of hand-clapping, as shown in FIG. 10A. alternatively, the sound detection section 162 could be formed in a housing that is separate from the housing of the operation section 161, as shown in FIG. 10B.

Note that terminology (such as operation input data, sound input data, operation input direction mark, and sound input direction mark) that is defined together with terminology used at least once within this document and figures (such as first input data, second input data, first direction mark, and second direction mark) could be replaced by other terminology wherever it is used within this document and figures, in either a broad sense or specifically.

The present invention has been described above as applied to a music game using an operation section that is formed in the shape of a percussion instrument as shown in FIG. 1, but it can also be applied to music games in which other musical instruments are used. It can also be applied to music games in which musical instruments are not used.

The present invention can also be applied to various game systems (image generation systems) such as arcade game systems, domestic game systems, large-scale attractions in which many players can participate, simulators, multimedia terminals, and mobile phones.

Although only some embodiments of the present invention have been described in detail above, those skilled in the art will readily appreciate that many modifications are possible in the embodiments without materially departing from the novel teachings and advantages of this invention. Accordingly, all such modifications are intended to be included within scope of this invention.

What is claimed is:

1. A computer-readable information storage medium which stores a program which causes a computer to function as:
   a music play section which plays music data stored in a storage section;
   a display control section which causes a display of a first direction mark and a second direction mark by linking to a play status of the music data, the first direction mark instructing a player to perform an operation of an operation section and the second direction mark instructing the player to perform a sound input action which is to be detected by a sound detection section;
   an input reception section which receives first input data and second input data, the first input data being generated based on an operation detection of the operation section and the second input data being generated based on a sound detection of the sound detection section;

an input determination section which compares the first input data and the second input data, determines that the first input data is valid in a case that it is determined that an operation with the operation section by the player and the sound input action by the player overlap within a given period, based on the first and second input data, and determines that both of the first and second input data are valid in other cases;

a timing fetch section which fetches an input timing for input data that has been determined to be valid by the input determination section; and an evaluation section which compares the fetched input timing and a reference timing, and evaluates the operation with the operation section by the player or the sound input action by the player that has been performed in answer to the first or second direction mark.

2. The computer-readable information storage medium as defined by claim 1, wherein the input determination section determines that the second input data is valid only when the sound input action by the player is determined to be performed within a predetermined input reception period relating to the second direction mark.

3. The computer-readable information storage medium as defined by claim 2, wherein the predetermined input reception period relating to the second direction mark is divided into a plurality of periods, and wherein the input determination section determines whether or not the second input data is valid only within each of the plurality of input reception periods.

4. The computer-readable information storage medium as defined by claim 2, wherein the display control section performs a display control of changing a relative positional relationship between a reference mark and the first and second direction marks in such a manner that the relative positional relationship becomes closer, the reference mark indicating the reference timing, and wherein a period during which the reference mark and the second direction mark overlap is set to be the predetermined input reception period relating to the second direction mark.

5. The computer-readable information storage medium as defined by claim 1, wherein the display control section performs a control of displaying to visualize the sound detection on the display section when the sound detection section detects a sound.

6. The computer-readable information storage medium as defined by claim 1, wherein the input determination section determines that the second input data is valid when a sound volume of a sound detected by the sound detection section is larger than a reference sound volume level, the second input data being generated based on the sound detection corresponding to the detected sound, and wherein the program further causes the computer to function as a reference sound volume level adjustment section which adjusts the reference sound volume level in accordance with a sound volume level of noise detected by the sound detection section.

7. The computer-readable information storage medium as defined by claim 1, wherein the input determination section reads out sample sound data which has been stored beforehand in the storage section, determines whether the second input data matches with the sample sound data by comparison, and determines the second input data to be valid when the second input data matches with the sample sound data.

8. The computer-readable information storage medium as defined by claim 7, wherein the program further causes the computer to function as a sample sound generation section which generates the sample sound data based on detection data for a sound input action performed by the player with respect to the sound detection section and causes the storage section to store the generated sample sound data.

9. The computer-readable information storage medium as defined by claim 1, wherein the program evaluates operations and sound input actions of a plurality of players with respect to a plurality of the operation sections and a plurality of the sound detection sections provided for the players, respectively, and wherein the input determination section fetches sound volume data detected by the sound detection sections, compares the magnitude of the sound volume detected by each of the sound detection sections based on the detected sound volume data, and determines that the second input data generated based on the sound detection of one of the sound detection sections determined to be closest to a location in which a sound has been generated is valid.

10. The computer-readable information storage medium as defined by claim 1, wherein the input determination section determines that the first input data to be valid, only when the operation detection of the operation section and the sound detection of the sound detection section are determined to overlap within a given period.

11. A computer-readable information storage medium which stores a program which causes a computer to function as:

a music play section which plays music data stored in a storage section;

a display control section which causes a display of a direction mark by linking to a play status of the music data, the direction mark instructing a player to perform an operation of an operation section;

an input reception section which receives first input data and second input data, the first input data being generated based on an operation detection of the operation section and the second input data being generated based on a sound detection of a sound detection section;

an input determination section which compares the first input data and the second input data, and determines that the first input data is valid only when it is determined that the operation detection of the operation section and the sound detection of the sound detection section overlap within a given period, based on the first and second input data;

a timing fetch section which fetches an input timing for the first input data that has been determined to be valid by the input determination section; and an evaluation section which compares the fetched input timing and a reference timing, and evaluates the operation with the operation section by the player that has been performed in answer to the direction mark.

12. A game system comprising:
a music play section which plays music data stored in a storage section;
a display control section which causes a display of a first direction mark and a second direction mark by linking to a play status of the music data, the first direction mark instructing a player to perform an operation of an operation section and the second direction mark instructing the player to perform a sound input action which is to be detected by a sound detection section;
an input reception section which receives first input data and second input data, the first input data being generated based on an operation detection of the operation section and the second input data being generated based on a sound detection of the sound detection section;
an input determination section which compares the first input data and the second input data, determines that the first input data is valid in a case that it is determined that an operation with the operation section by the player and the sound input action by the player overlap within a given period, and determines that both of the generated first and second input data are valid in other cases;
a timing fetch section which fetches an input timing for input data that has been determined to be valid by the input determination section; and
an evaluation section which compares the fetched input timing and a reference timing, and evaluates the operation with the operation section by the player or the sound input action by the player that has been performed in answer to the first or second direction mark.

13. An input device comprising:
an operation section which detects an operation performed by a player with respect to a predetermined operation area;
a sound detection section which detects a sound generated by a sound input action performed by the player;
an input data generation section which generates first input data based on the operation detection of the operation section and second input data based on the sound detection of the sound detection section; and
an input determination section which compares the first input data and the second input data, determines that the first input data is valid when it is determined that the first and second input data are generated overlapping within a given period, and determines that both the first and second input data are valid in other cases.

14. The input device as defined by claim 13, further comprising:
a detection display section which outputs a display to visualize the sound detection when a sound is detected by the sound detection section.

15. The input device as defined by claim 13, further comprising:
a sound detection confirmation operation section which performs a given confirmation operation based on the sound detection, when a sound is detected by the sound detection section.

16. The input device as defined by claim 13,
wherein the input determination section determines that the second input data is valid when a sound volume of a sound detected by the sound detection section is larger than a reference sound volume level, the second input data being generated based on the sound detection corresponding to the detected sound, and
wherein the input device includes a reference sound volume level adjustment section for adjusting the reference sound volume level in accordance with a sound volume level of noise detected by the sound detection section.

17. A method of controlling a game system for a music game in which a player plays by operating an operation section and performs a sound input action on a sound detection section, the method comprising:
playing music data stored in a storage section;
causing a display of a first direction mark and a second direction mark by linking to a play status of the music data, the first direction mark instructing a player to perform an operation of an operation section and the second direction mark instructing the player to perform a sound input action which is to be detected by a sound detection section;
receiving first input data and second input data, the first input data being generated based on an operation detection of the operation section and the second input data being generated based on a sound detection of the sound detection section;
comparing the first input data and the second input data, determining that the first input data is valid in a case that it is determined that an operation with the operation section by the player and the sound input action by the player overlap within a given period, and determining that both of the first and second input data are valid in other cases;
fetching an input timing for input data that has been determined to be valid by the input determination section; and
comparing the fetched input timing and a reference timing, and evaluating the operation with the operation section by the player or the sound input action by the player that has been performed in answer to the first or second direction mark.

18. An input detection method comprising:
generating first input data based on an operation detection of an operation section which detects an operation performed by a player with respect to a predetermined operation area;
generating second input data based on a sound detection of a sound detection section which detects a sound generated by a sound input action performed by the player; and
comparing the first input data and the second input data, determining that the first input data is valid when it is determined that the first and second input data are generated overlapping within a given period, and determining that both the first and second input data are valid in other cases.

* * * * *